US010641372B2

(12) United States Patent
Ladriere et al.

(10) Patent No.: US 10,641,372 B2
(45) Date of Patent: May 5, 2020

(54) GEARBOX UNIT FOR A FARM VEHICLE WITH A WIDE RANGE OF SPEEDS

(71) Applicant: GROUPEMENT INTERNATIONAL DE MECANIQUE AGRICOLE, Beauvais (FR)

(72) Inventors: Pascal Ladriere, Fontaine-au-Bois (FR); Didier Folliot, Noailles (FR); Oscar Cuevas Melo, Beauvais (FR)

(73) Assignee: GROUPEMENT INTERNATIONAL DE MECANIQUE AGRICOLE (FR)

( * ) Notice: Subject to any disclaimer, the term of this patent is extended or adjusted under 35 U.S.C. 154(b) by 11 days.

(21) Appl. No.: 15/765,313

(22) PCT Filed: Oct. 7, 2016

(86) PCT No.: PCT/FR2016/052593
§ 371 (c)(1),
(2) Date: Apr. 2, 2018

(87) PCT Pub. No.: WO2017/060645
PCT Pub. Date: Apr. 13, 2017

(65) Prior Publication Data
US 2018/0306292 A1 Oct. 25, 2018

(30) Foreign Application Priority Data
Oct. 8, 2015 (FR) ...................................... 15 59579

(51) Int. Cl.
*F16H 37/04* (2006.01)
*F16H 3/00* (2006.01)
*A01B 76/00* (2006.01)

(52) U.S. Cl.
CPC ........... *F16H 37/042* (2013.01); *A01B 76/00* (2013.01); *F16H 3/006* (2013.01); *F16H 2037/049* (2013.01); *F16H 2200/0078* (2013.01)

(58) Field of Classification Search
CPC .. F16H 37/042; F16H 2037/049; F16H 3/006; F16H 2200/0078; F16H 37/04
See application file for complete search history.

(56) References Cited

U.S. PATENT DOCUMENTS

| | | | |
|---|---|---|---|
| 6,003,391 A * | 12/1999 | Kojima | B60K 17/28 180/53.1 |
| 6,190,280 B1 * | 2/2001 | Horsch | F16H 37/042 475/209 |
| 2006/0142104 A1 * | 6/2006 | Saller | B60K 6/365 475/5 |

FOREIGN PATENT DOCUMENTS

| | | |
|---|---|---|
| CN | 101450609 A | 6/2009 |
| DE | 34 14 107 A1 | 10/1985 |
| DE | 10 2013 110 709 A1 | 4/2015 |

OTHER PUBLICATIONS

International Search Report dated Jan. 17, 2017 in corresponding PCT International Application No. PCT/FR2016/052593.

(Continued)

*Primary Examiner* — Huan Le
(74) *Attorney, Agent, or Firm* — Ostrolenk Faber LLP

(57) ABSTRACT

A gearbox assembly that includes a system of stacked planetary gearsets; a clutch device including an input clutch shaft and an output clutch shaft; a large clutch wheel and a small clutch wheel mounted idle on the output clutch shaft; a clutch coupling device for coupling the small and large wheels with the output clutch shaft; an output shaft includ- (Continued)

ing a small output wheel meshing with the large clutch wheel and a large output wheel meshing with the small clutch wheel.

10 Claims, 1 Drawing Sheet

(56) References Cited

OTHER PUBLICATIONS

Written Opinion dated Jan. 17, 2017 in corresponding PCT International Application No. PCT/FR2016/052593.

\* cited by examiner

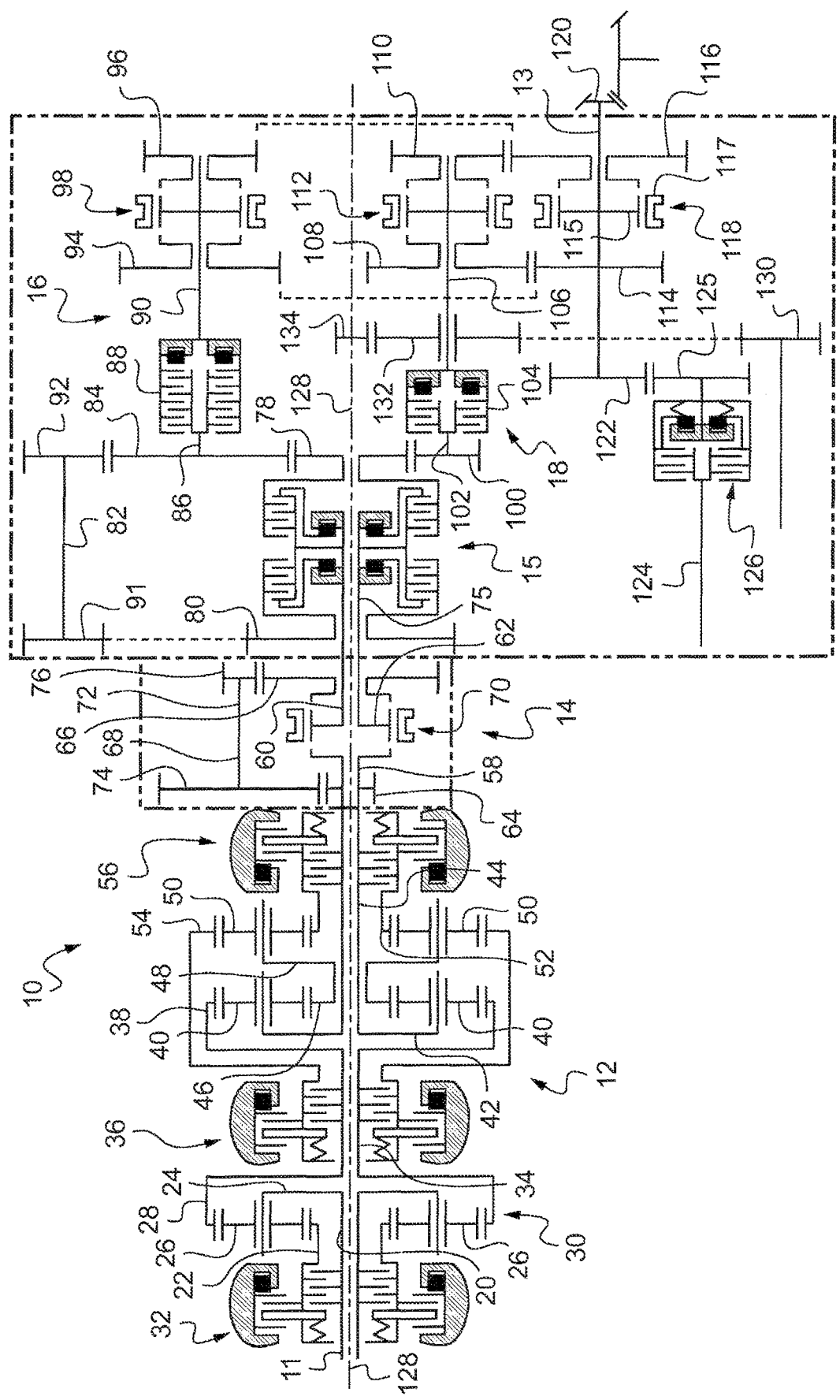

GEARBOX UNIT FOR A FARM VEHICLE WITH A WIDE RANGE OF SPEEDS

CROSS-REFERENCE TO RELATED APPLICATION

The present application is a 35 U.S.C. §§ 371 national phase conversion of PCT/FR2016/052593, filed Oct. 7, 2016, which claims priority to French Patent Application No. 1559579, filed Oct. 8, 2015, the contents of which are incorporated herein by reference. The PCT International Application was published in the French language.

TECHNICAL FIELD

This invention relates to a gearbox unit for a motor-driven farm vehicle.

BACKGROUND OF THE INVENTION

Motor-driven farm vehicle gearboxes can provide a large number of possible speed ratios for the vehicle so that working equipment can be carried or pulled under optimum conditions considering the nature of the ground to be worked. In other words, gearboxes can adapt the vehicle speed to match encountered variations in resistance to progress. Furthermore, recent gearboxes include at least two parallel shaft clutches to make it possible to change from one gear to another without releasing the load, in other words without the loss of driving force during the gear change.

Normal farm vehicle gearboxes also include a large number of possible speed ratios with close speed ranges.

It is now required that gearboxes should not only have a large number of possible speed ratios, but also that speed ratios should vary over a range from very slow to very fast, for example with a range from a few hundred metres per hour up to 50 km per hour.

To achieve this, it has been thought that planetary gear systems can be staged inside gearboxes. Large reduction ratios can be obtained with this mechanical transmission system, although it is relatively compact compared with normal gearboxes.

Refer to document DE 10 2013 110 709 A1 that discloses a gearbox unit designed precisely to obtain wide speed ranges. It thus includes a system of staged planetary gears coupled at the input to the drive shaft and capable of providing a plurality of first transmission ratios. The output of the planetary gear system is coupled with two parallel clutch devices. Each clutch device comprises an input shaft clutch coupled to the planetary gear system and another output shaft clutch. For each clutch device, the unit comprises a large high speed clutch wheel and a small low speed clutch wheel both installed free to rotate on the output shaft clutch to be able to provide two second transmission ratios. It also includes a clutch coupling device for each clutch device, so that either the low speed or high speed wheels can be coupled with the output shaft clutch. The unit also comprises an output shaft comprising a small high speed output wheel engaging with the large high speed clutch wheels and a large low speed output wheel engaging with small low speed clutch wheels of two clutch devices. It is understood in this case that the wheels mentioned herein are gear wheels with parallel teeth. However, the output shaft is fitted with a conical pinion engaging a conical wheel that is mechanically coupled to a differential.

With this gearbox unit, a motor-driven vehicle is obtained with a large number of speed ratios over a wide speed range.

However, premature wear of the clutch wheels has been observed for some vehicles, and under some working conditions. Furthermore, the large number of successive or parallel gear trains in such gearbox units makes their mechanical efficiency poor.

Another problem that arises and that this invention is intended to solve is to provide a gearbox unit that in particular can reduce wear of its component elements and also improve the mechanical efficiency.

SUMMARY OF THE INVENTION

This can be achieved using a gearbox unit for a motor-driven farm vehicle comprising: a system of staged planetary gears to provide a plurality of first transmission ratios; a clutch device comprising a shaft clutch with input coupled to said planetary gear system and an output shaft clutch; a large high speed clutch wheel and a small low speed clutch wheel both installed free to rotate on said output shaft clutch to provide two second transmission ratios; a clutch coupling device to be able to couple one of said low and high speed wheels with said output shaft clutch; and an output shaft comprising a small high speed output wheel engaging with said large high speed clutch wheel and a large low speed output wheel engaging with said small low speed clutch wheel. The set of clutches also comprises an uncoupling device between said output shaft and said large low speed output wheel to be able to release said output shaft from the small low speed clutch wheel.

Thus, one characteristic of the invention lies in the possibility of being able to uncouple the output shaft and the large low speed output wheel, precisely when the output shaft is driven at high speed through the small high speed output wheel engaging with the large high speed clutch wheel. Because when the output shaft is driven at high speed, the large low speed output wheel starts to drive and then drives the small low speed clutch wheel at high speed, at the risk of damaging it. Uncoupling thus makes it possible to leave the large low speed output wheel and consequently the small low speed clutch wheel at rest. The small low speed clutch wheel is thus protected. Furthermore, the mechanical efficiency of the gearboxes improves since these wheels are stopped.

According to one preferred embodiment of the invention, said large low speed output wheel is installed free to rotate on said output shaft. Said decoupling device also comprises a fixed wheel fixed to said output shaft and a coupling device fixed to said fixed wheel capable of being rotated to engage said fixed wheel to said large low speed output wheel. In this way, the uncoupling device composed of several elements is reversible. In other words, the coupling device can be controlled between a coupling position in which the fixed wheel and the large low speed output wheel are coupled, and a decoupling position in which the low speed output wheel is not fixed to the fixed wheel.

The clutch device also comprises a clutch that can be controlled, for example hydraulically, located between said input shaft clutch and said output shaft clutch. Thus, the input shaft clutch and the output shaft clutch are coaxial and the controllable clutch is installed between the two.

According to one particularly advantageous embodiment of the invention, the gearbox unit also comprises: another clutch device comprising another input shaft clutch coupled to said planetary gear system and another output shaft clutch; another large high speed clutch wheel and another small low speed clutch wheel both mounted free to rotate on said output shaft clutch to be able to provide two other second transmission ratios, said other large and small high and low speed clutch wheels engaging with said small and large high and low speed output wheels respectively; and another clutch coupling device to be able to couple one of said other low and high speed wheels with said other output shaft clutch.

In other words, the gearbox unit comprises two clutch devices each comprising an input shaft clutch coupled to said planetary gear system and an output shaft clutch. Each clutch device comprises another large high speed clutch wheel and a small low speed clutch wheel both installed free to rotate on said other output shaft clutch to be able to provide two second transmission ratios, said large and small high and low speed clutch wheels engaging with said small and large high and low speed output wheels respectively. Each also includes a clutch coupling device to be able to couple either of said low and high speed wheels with said output shaft clutch.

Thus, as will be explained below, four different second transmission ratios can be obtained through the use of two parallel clutch devices and their output shaft clutch each fitted with a large high speed clutch wheel and a small low speed clutch wheel. In this way, a total of twenty-eight different speed ratios can be obtained according to one particularly advantageous embodiment of the invention in which the system of staged planetary gears includes seven first transmission ratios.

Said other clutch device also includes another controllable clutch located between said other input shaft clutch and said other output shaft clutch. The other controllable shaft performs the same role as the first in the first clutch device.

According to one particularly advantageous embodiment of the invention, the gearbox unit also comprises an inverter module located between said system of staged planetary gears and said clutch device to be able to invert the direction of rotation of said input shaft clutch. When the gearbox unit comprises two clutch devices, the inverter module is coupled parallel to the two clutch devices by means described in more detail later in the remainder of the description.

Furthermore, said inverter module also comprises firstly a receiving shaft coupled to said planetary gear system and secondly two inversion wheels installed free to rotate on said receiving shaft and two inversion clutches to be able to couple said two inversions wheels to said clutch device alternately.

According to another embodiment of the invention, the inverter module is located upstream from the system of staged planetary gears. The consequences on the layout of the different elements will be explained in more detail in the remainder of the description.

Thus, due to the two inversion clutches that drive the receiving shaft by friction with one or the other of the two inversion wheels, the direction of rotation can be changed from one direction to the inverse direction more easily, and consequently more comfortably from forward running to reverse running.

Furthermore, the gearbox unit comprises a transmission reduction module located between said system of staged planetary gears and said clutch device to be able to reduce the transmission ratios of said plurality of transmission ratios. Such a transmission reduction module can either transmit the rotation movement at the output of the system of staged planetary gears without any reduction or demultiplication at the clutch device, or it can considerably reduce the rotation movement so as to be able to obtain extremely low speeds. For example such a reduction gear can give speeds of the order of 250 m per hour.

Thus, said system of staged planetary gears comprises three sets of planetary wheels and three sets of satellite wheels installed in said three sets of planet wheels respectively. The system of staged planetary gears will be described in more detail in the remainder of the description. Such a mechanical system can give a wide range of transmission ratios for a given input speed, while being compact.

BRIEF DESCRIPTION OF DRAWING

Other features and advantages of the invention will become clear after reading the description given below of a particular embodiment of the invention given for guidance but that is in no way limitative with reference to the appended drawing on which:

the single FIGURE (or "the FIGURE") is a diagrammatic side view of a gearbox unit according to the invention.

DESCRIPTION OF PREFERRED EMBODIMENTS

The single Figure shows a gearbox unit 10 comprising four successive subassemblies between an input shaft 11 coupled to the engine shaft not shown, and an output shaft 13. The gearbox unit 10 thus comprises a system of staged planetary gears 12; a transmission reducing module 14; a running direction inverter module 15; and two parallel clutch devices, a first 16 and a second 18.

The input shaft 11 is prolonged through the system of staged planetary gears 12 by a first hollow shaft segment 20 that passes through a first inner planet gear 22 and is connected to a first satellite holder 24. This satellite holder comprises a first set of satellites 26 engaging the first inner planet gear 22 and a first outer planet gear 28. This first group forms a first planetary gear system 30.

Furthermore, the system of system of staged planetary gears 12 comprises a first blocking device 32 that when in the released position, couples the first inner planet gear 22 with the first satellite holder 24 in rotation, and in an active position holds the first inner planet gear 22 in a fixed position while releasing the first satellite holder 24.

The first outer planet gear 28 is fixed to an intermediate hollow shaft segment 34 that extends coaxially prolonging the first hollow shaft segment 20 and passing through a second blocking device 36 to join a second outer planet gear 38 symmetric to the first outer planet gear 28. A second set of satellites 40 is engaged inside this second outer planet gear 38, supported by a satellite holder 42 fixed to a last hollow shaft segment 44 that extends coaxially prolonging the intermediate hollow shaft segment 34.

The second set of satellites 40 also engages a second inner planet gear 46 which is fixed to a third satellite holder 48. The last hollow shaft segment 44 passes freely through the second inner planet gear 46 and the third satellite holder 48.

The third satellite holder 48 supports a third satellite set 50, engaging with a third inner planet gear 52 and a third outer planet gear 54.

When in a released position, the second blocking device 36 couples the first outer planet gear 28 fixed to the second outer planet gear 38 and the third outer planet gear 54 in rotation, and in an active position, it holds the third outer planet gear 54 in a fixed position while the associated first outer planet gear 28 and the second outer planet gear 38 are free.

The system of staged planetary gears 12 comprises a third blocking device 56 which when in a released position couples the last hollow shaft segment 44 and the third inner planet gear 52 in rotation. In an active position, the third blocking device 56 holds the third inner planet gear 52 in a fixed position while the last hollow shaft segment 44 is free.

Furthermore, the first 22, second 46 and third 52 inner planet gears have the same number of teeth. For example, there are between sixty-five and seventy-seven teeth. Since these are satellites of the first 26, second 40 and third 50 sets of satellites, they have the same number of teeth, for example between seventeen and nineteen teeth. The first 28, second 38 and third 54 outer planets gears also have the same number of teeth, advantageously between a hundred and one and a hundred and three teeth.

Thus, the three blocking devices 32, 36 and 56, each controlled by a hydraulic device can each be in one of two states, at rest or active, and consequently all of the three devices may be in eight distinct states. In practice, seven transmission ratios are used between the input shaft 11 and the last hollow shaft segment 44.

Thus, a first first speed ratio A corresponds to a state in which the first blocking device 32 is at rest, while the second 36 and third 56 blocking devices are active.

A second first speed ratio B corresponds to a state in which the first 32 and the third 56 blocking devices are at rest while the second blocking device 36 is active.

A third first speed ratio C corresponds to a state in which the first 32 and the second 36 blocking devices are at rest while the third blocking device 56 is active.

A fourth first speed ratio D corresponds to a state in which the first 32, second 36 and third 56 blocking devices are at rest.

A fifth first speed ratio E corresponds to a state in which the first 32 and the second 36 blocking devices are active while the third blocking device 56 is at rest.

A sixth first speed ratio F corresponds to a state in which the first 32 and the third 56 blocking devices are active while the second blocking device 36 is at rest.

And a seventh first speed ratio G corresponds to a state in which the first blocking device 32 is active while the second 36 and third 56 blocking devices are at rest.

The last hollow shaft segment 44 extends through the transmission reducing module 14 and terminates by a coupling end of the last segment 58.

The transmission reducing module 14 has a hollow reduction shaft segment 60 that extends coaxially prolonging the last hollow shaft segment 44 as far as the running inverter module 15 that will be described below.

The hollow reduction shaft segment 60 has one reduction segment coupling end 62 extending facing the coupling end of the last segment 58. Furthermore, the coupling end of the last segment 58 comprises a small wheel of the last reduction segment 64 behind it, while the coupling end of the reduction segment 62 comprises a large reduction segment wheel 66 behind it mounted free to rotate.

Furthermore, the transmission reduction module 14 comprises firstly a rotation coupling device 68 between the small wheel of the last reduction segment 64 and the large reduction segment wheel 66, and secondly a reduction coupling device 70. The rotation coupling device 68 comprises a reduction shaft 72 extending parallel to the hollow reduction shaft segment 60 and the last hollow shaft segment 44, said reduction shaft 72 comprises firstly a large reduction shaft wheel 74 engaging the small last reduction segment wheel 64 and secondly a small reduction shaft wheel 76 engaging the large reduction segment wheel 66. The reduction coupling device 70 when in a first position couples the coupling end of the last segment 58 directly with the coupling end of the reduction segment 62 and in a second position couples the coupling end of the reduction segment 62 with the large reduction segment wheel 66. Also in the first coupling position of the reduction coupling device 70, the coupling end of the last segment 58 comes into direct contact with the coupling end of the reduction segment 62 without a reduction in the rotation speed, while in the second coupling position, the coupling end of the reduction segment 62 engages with the large reduction segment wheel 66. And in this second coupling position, considering the different wheel diameter ratios, or the teeth ratios in these wheels, a large speed reduction is obtained between the last hollow shaft segment 44 and the hollow reduction shaft segment 60.

According to a first embodiment in which the gearbox unit 10 is made to provide twenty-one speed ratios, firstly the small wheel of the last reduction segment 64 comprises for example between twenty-five and twenty-seven teeth, while the large reduction segment wheel 66 comprises between fifty-nine and sixty-one teeth, and secondly the large reduction shaft wheel 74 comprises between sixty and sixty-two teeth, while the small reduction shaft wheel 76 comprises between thirteen and fifteen teeth.

According to a second embodiment in which the gearbox 10 provides twenty-eight speed ratios, firstly the small wheel of the last reduction segment 64 comprises for example between twenty-one and twenty-three teeth, while the large reduction segment wheel 66 comprises between seventy and seventy-two teeth, and secondly the large reduction shaft wheel 74 comprises between seventy and seventy-two teeth, while the small reduction shaft wheel 76 comprises between twenty one and twenty three teeth.

The hollow reduction shaft segment 60 is connected to the input of the running inverter module 15, and is prolonged by a receiving shaft 75, and it comprises two inversion output wheels, a first inversion output wheel 78 and a second inversion output wheel 80. The two inversion output wheels 78, 80 are driven in rotation in the same direction. On the other hand, as will be explained below, the first inversion output wheel 78 is directly coupled to the two parallel clutch devices 16, 18 while the second inversion output wheel 80 is coupled to them through an inversion coupling device 82. The latter comprises an inverse coupling input wheel 91 engaging with the second inversion output wheel 80 and an inverse coupling output wheel 92.

The second inversion output wheel 80 for example comprises between sixty-six and sixty-eight teeth, and the first inversion output wheel 78 comprises between forty-six and forty-eight teeth, while the inverse coupling input wheel 91 comprises between thirty-three and thirty-five teeth and the inverse coupling output wheel 92 comprises between twenty-three and twenty-five teeth.

It will be observed that the transmission reduction module 14 is optional and consequently when it is not installed in the gearbox unit, the last hollow shaft segment 44 is prolonged by the receiving shaft 75 and thus joins the running direction inverter module 15 directly.

Furthermore, according to one variant embodiment, the running direction inverter module 15 is located on the input side of the system of staged planetary gears, and the input shaft then corresponds to the output from the inverter, while the receiving shaft is prolonged and terminates by a wheel corresponding to the first inversion output wheel 78.

The first clutch device 16 comprises a first input clutch wheel 84 mounted on a first input shaft clutch 86, a first controllable clutch 88 and a first output shaft clutch 90. It will be observed that the first input clutch wheel 84 engages the first inversion output wheel 78 and also the inverse coupling output wheel 92 of the inverter coupling device 82.

Furthermore, a first large high speed clutch wheel 94 is installed free to rotate on the first output shaft clutch 90 and a first small low speed clutch wheel 96 is also mounted free to rotate on the first output shaft clutch 90. Between the two, a first clutch coupling device 98 is installed on the first output shaft clutch 90. This first clutch coupling device 98 is controllable in a first position in which it couples the first output shaft clutch 90 in rotation with the first large high speed clutch wheel 94. It can also be controlled in a second position in which it couples the first output shaft clutch 90 in rotation with the first small low speed clutch wheel 96. It will be observed that the first clutch coupling device 98 is also controllable in a neutral position intermediate between the first and the second positions, in which it is free from the first large high speed clutch wheel 94 and the first small low speed clutch wheel 96.

Furthermore, according to the first embodiment in which the gearbox 10 has twenty-one speed ratios, the first input clutch wheel 84, the first large high speed clutch wheel 94 and the first small low speed clutch wheel 96 have for example between fifty-nine and sixty-one teeth, between forty-six and forty-eight teeth, and between twenty and twenty-two teeth respectively. In the second embodiment in which the gearbox 10 has twenty-eight speed ratios, the first input clutch wheel 84, the first large high speed clutch wheel 94 and the first small low speed clutch wheel 96 comprise between sixty and sixty-two teeth, between thirty-six and thirty-eight teeth, and between twenty and twenty-two teeth respectively.

At the same time, the second clutch device 18 comprises a second input clutch wheel 100 mounted on a second input shaft clutch 102 engaging the single first inversion output wheel 78, a second controllable clutch 104 and a second output shaft clutch 106. A second large high speed clutch wheel 108 is mounted free to rotate on the second output shaft clutch 106, while a second small low speed clutch wheel 110 is mounted on it free to rotate. A second clutch coupling device 112 located between the two is installed on the second output shaft clutch 106. It can be controlled in a first position in which it couples in rotation the second output shaft clutch 106 in rotation with the second large high speed clutch wheel 108, and in a second position in which it couples in rotation the second output shaft clutch 106 with the second small low speed clutch wheel 110. Similarly to the first clutch device 16, the second clutch coupling device 112 can also be controlled in a neutral position between the first and the second position, to obtain the same effects.

Furthermore, the inverse coupling output wheel 92 of the inverter coupling device 82 engages the first input clutch wheel 84 as shown in the Figure, but it could equally well engage the second input clutch wheel 100 without any modification to obtain the same function.

Furthermore, according to the first embodiment in which the gearbox 10 provides twenty-one speed ratios, the second input clutch wheel 100, the second large high speed clutch wheel 108 and the second small low speed clutch wheel 110 have between twenty-five and twenty-seven teeth, between forty-six and forty-eight teeth, and between twenty and twenty-two teeth respectively. In the second embodiment in which the gearbox 10 provides twenty-eight speed ratios, the second input clutch wheel 100, the first large high speed clutch wheel 108 and the first small low speed clutch wheel 110 have between twenty-four and twenty-six teeth, between forty-four and forty-six teeth and between twenty-five and twenty-seven teeth respectively.

The first embodiment in which the high speed clutch wheels 94, 108 have the same number of teeth and low speed clutch wheels 96, 110 have the same number of teeth in the two clutch devices 16, 18, is advantageous in terms of standardisation. On the other hand, the first input clutch wheel 84 of the first clutch device 16 has a different number of teeth from the second input clutch wheel 100 of the second clutch device 18, so that the second transmission ratios are different. Such a device can be used to design a single high speed clutch wheel/clutch coupling device/small low speed clutch wheel assembly, and consequently at a more advantageous cost.

We will now describe the output shaft 13 and its different methods of connection with the two clutch devices 16, 18. Thus, a small high speed output wheel 114 is mounted fixed on the output shaft 13, and a large low speed output wheel 116 is mounted free to rotate. The small high speed output wheel 114 engages both the second large high speed clutch wheel 108 and the first large high speed clutch wheel 94, while the large low speed output wheel 116 engages both the second small low speed clutch wheel 110 and the first small low speed clutch wheel 96. The output shaft 13 is also fitted with a decoupling device 118 comprising a fixed wheel 115 fixed to the output shaft 13 and a controllable coupling device 117. The latter can be controlled between a coupling position in which it brings the fixed wheel 115 into contact with the large low speed output wheel 116 and then in which it couples the output shaft 13 and the large low speed output wheel 116 in rotation, and a decoupling position in which the fixed wheel 115 is free from the large low speed output wheel 116 and consequently in which the large low speed output wheel 116 is free from the output shaft 13.

According to the first embodiment in which the gearbox 10 outputs twenty-one speed ratios, the small high speed output wheel 114 and the large low speed output wheel 116 have for example between thirty-eight and forty teeth, and between seventy-seven and seventy-nine teeth respectively. In the second embodiment in which the gearbox 10 provides twenty-eight speed ratios, the small high speed output wheel 114 and the large low speed output wheel 116 comprise for example forty-two and forty-four teeth, and between seventy-nine and eighty-one teeth respectively.

With the coupling/decoupling device 118, the large low speed output wheel 116 and then the first and second small low speed clutch wheels 96, 110 may be free from the output shaft 13 and consequently remain at rest when the output shaft is driven at high speed through the small high speed output wheel 114. In these circumstances, the second output shaft clutch 106 and consequently the second large high speed clutch wheel 108 drive the output shaft 13, since the second input clutch wheel 100 has a smaller number of teeth than the first input clutch wheel 84. Thus, when the last hollow shaft segment 44 is driven in rotation at its maximum speed through the system of staged planetary gears 12, the coupling reduction device 70 is in the first coupling position and the running direction inverter module 15 is in a forward running position, in other words the first inversion output wheel 78 is driving while the second clutch 104 is engaged, the speed of the output shaft 13 is maximum. Also, by uncoupling the large low speed output wheel 116 from the output shaft 13, the large low speed output wheel 116 and the first and second small low speed clutch wheels 96, 110 are brought to rest. If they were not at rest, their speed would be very high, of the order of 20,000 rpm. Under these circumstances, wear would be accelerated. Thus by uncoupling, the first and second small low speed clutch wheels 96, 110 are protected from premature aging.

It is also advantageous to release the first and second small low speed clutch wheels 96, 110 from the output shaft 13 before extreme speeds are reached, when the first output shaft clutch 90 drives the output shaft 13 through the first large high speed clutch wheel 94. The first and the second small low speed clutch wheels 96, 110 are thus at rest over a wider range of speeds and consequently they are better protected.

The mechanical efficiency of the gearbox unit 10 according to the invention is also improved due to the smaller number of moving mechanical elements.

Furthermore, the output end of the output shaft 13 is terminated by a bevel gear 120 so that it can be mechanically connected to a differential not shown. The output shaft is also fitted with an output wheel 122 that will be coupled in rotation to a drive shaft of other wheels 124 through a clutch of four driving wheels 126. The latter has an input wheel 125. In other words, apart from the two rear wheels of the motor-driven farm vehicle that are driven through the bevel gear 120, the two front wheels of the motor-driven farm vehicle are driven through the drive shaft 124 of the other wheels.

According to the first embodiment in which the gearbox 10 provides twenty-one speed ratios, and according to a first variant, the output wheel 122 and the input wheel 125 have for example between thirty-four and thirty-six teeth, and between sixty-five and sixty-seven teeth respectively. According to a second variant, the output wheel 122 and the input wheel 125 have for example between thirty-three and thirty-five and between sixty-six and sixty-eight teeth respectively. In the second embodiment in which the gearbox 10 provides twenty-eight speed ratios and according to a first variant, the output wheel 122 and the input wheel 125 have for example between forty-seven and forty-nine, and between seventy-seven and seventy-nine teeth respectively. According to a second variant, the output wheel 122 and the input wheel 125 have for example between thirty-nine and forty-one, and between sixty-seven and sixty-nine teeth respectively.

Furthermore, the gearbox unit 10 comprises a drive shaft 128 for example coupled directly to the input shaft 11 and that axially and freely passes through the system of staged planetary gears 12, the transmission reduction module 14 and the running inverter module 15, and successively through: the first hollow shaft segment 20, the intermediate hollow shaft segment 34, the last hollow shaft segment 44, the hollow reduction shaft segment 60, to end up directly facing the two parallel clutch devices 16, 18. Due to the drive shaft 128, hydraulic pumps in particular, not shown, can be driven through drive devices located approximately facing the controllable clutches 88, 104 rather than along the axial prolongation of the parallel clutch devices 16, 18. These drive devices also comprise a pump drive wheel 130 coupled to the drive shaft 128 through a transfer wheel 132 mounted free to rotate on the second output shaft clutch 106, between the second controllable clutch 104 and the second large high speed clutch wheel 108, said transfer wheel 132 engages a transmission wheel 134 fixed to the drive shaft 128. Thus, the gearbox is significantly shorter along the axial direction. This is possible because the second controllable clutch 104 is shorter than the first 88 and it thus releases space to install the transfer wheel 132.

Furthermore, the pump drive wheel 130, the transfer wheel 132 and the transmission wheel 134 have for example between twenty-four and twenty six-teeth, between fifty-three and fifty-six teeth and between thirty-four and thirty-six teeth respectively.

The invention claimed is:

1. A gearbox unit for a farming motor vehicle comprising:
    a system of staged planetary gears in order to provide a plurality of first transmission ratios;
    a clutch device comprising an input shaft clutch coupled to said system of staged planetary gears and an output shaft clutch;
    a large high speed clutch wheel rotatably mounted on said output shaft, and a small low speed clutch wheel rotatably mounted on said output shaft clutch in order to provide two second transmission ratios;
    a clutch coupling device in order to be able to couple one or the other of said low and high speed wheels with said output shaft clutch;
    an output shaft comprising a small high speed output wheel meshing with said large high speed clutch wheel and a large low speed output wheel meshing with said small low speed clutch wheel; and
    further comprising a decoupling device between said output shaft and said large low speed output wheel in order to be able to release said output shaft from said small low speed clutch wheel.

2. The gearbox unit according to claim 1, wherein said large low speed output wheel is rotatably mounted on said output shaft.

3. The gearbox unit according to claim 1, wherein said decoupling device comprises a fixed wheel integral with said output shaft and a coupling member integral with said fixed wheel able to be controlled in order to engage said fixed wheel and said large low speed output wheel.

4. The gearbox unit according to claim 1, wherein said clutch device comprises a clutch that can be controlled and is located between said input shaft clutch and said output shaft clutch.

5. The gearbox unit according to claim 1, further comprising:
    another clutch device comprising, another input shaft clutch coupled to said system of planetary gears and another output shaft clutch;
    another large high speed clutch wheel rotatably mounted on said another output shaft clutch, and another small low speed clutch wheel rotatably mounted on said another output shaft clutch in order to be able to provide two other second transmission ratios, said another large and small high and low speed clutch wheels meshing respectively with said small and large high and low speed output wheels; and,
    another clutch coupling device in order to be able to couple one or the other of said another low and high speed wheels with said another output shaft clutch.

6. The gearbox unit according to claim 5, wherein said another clutch device comprises another clutch that can be controlled located between said another input shaft clutch and said another output shaft clutch.

7. The gearbox unit according to claim 1, further comprising an inverter module located between said system of staged planetary gears and said clutch device in order to be able to reverse a direction of rotation of said input shaft clutch.

8. The gearbox unit according to claim 7, wherein said inverter module comprises a receiving shaft coupled to said system of staged planetary gears and two inversion wheels rotatably mounted on said receiving shaft and two inversion clutches in order to alternatively couple said two inversion wheels to said clutch device.

9. The gearbox unit according to claim 1, further comprising a transmission reducing module located between said system of staged planetary gears and said clutch device in order to be able to reduce the transmission ratios of said plurality of first transmission ratios.

10. The gearbox unit according to claim 1, wherein said system of staged planetary gears comprises three sets of planetary gears and three sets of satellite gears mounted respectively in said three sets of planetary gears.

* * * * *